March 24, 1925.  E. J. WILLIAMS  1,530,634
EQUESTRIAN TOY
Filed Oct. 29, 1923  3 Sheets-Sheet 2
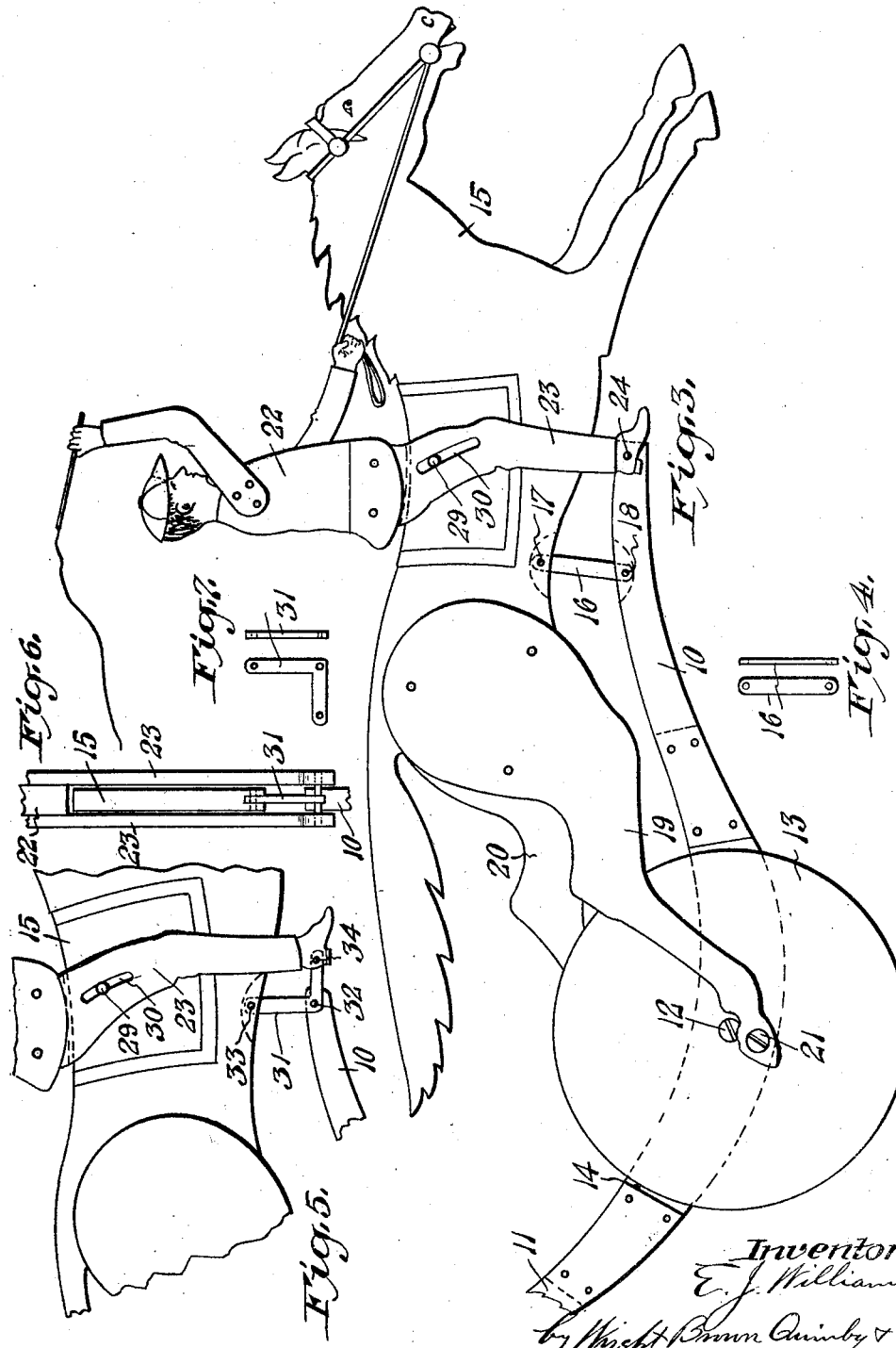

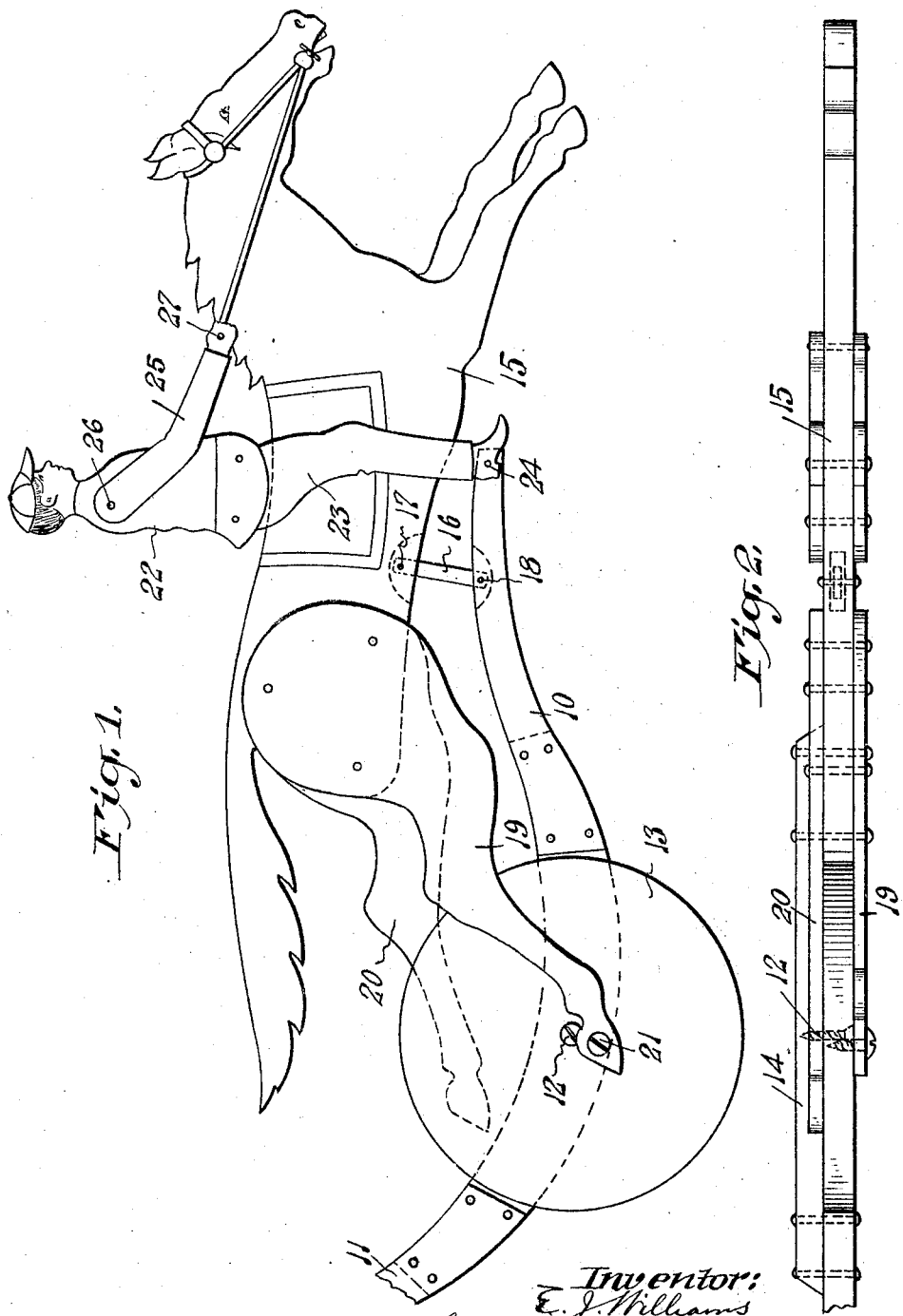

March 24, 1925.

E. J. WILLIAMS
EQUESTRIAN TOY
Filed Oct. 29, 1923

INVENTOR
E. J. Williams
BY Wright, Brown,
Quinby & May
ATTORNEY

Patented Mar. 24, 1925.

1,530,634

UNITED STATES PATENT OFFICE.

ELHANAN J. WILLIAMS, OF WALTHAM, MASSACHUSETTS.

EQUESTRIAN TOY.

Application filed October 29, 1923. Serial No. 671,297.

*To all whom it may concern:*

Be it known that I, ELHANAN J. WILLIAMS, a citizen of the United States, residing at Waltham, in the county of Middlesex and State of Massachusetts, have invented new and useful Improvements in Equestrian Toys, of which the following is a specification.

The subject of the present invention is a toy intended for the amusement of children and adapted to be trundled over the floor or the ground. It includes the figure of an animal and also that of a rider mounted on the animal, together with means for giving to the figures of the animal and of the rider movements resembling those of an equestrian and his mount. For this reason, and as a convenient descriptive term, I have entitled the invention "equestrian toy."

I have also chosen to illustrate in the drawings forming a part of this specification a horse as the animal a figure of which forms part of the toy. I wish it clearly understood, however, that in thus illustrating and entitling the invention I have not intended to limit my protection to a toy in which the animal is a horse and no other, or to one of which a rider also is a part; for the same principles in which the novel features of the invention reside may be applied and used whether the figure of the animal represents a horse or a rabbit, or any other animal which runs or gallops; and those features of the invention which are concerned with giving a realistic movement to the animal are protected herein independently of the presence of the rider. In other words, it is my purpose to protect all novel principles and means for giving a combination of movements either to the figure of an animal and of a rider, or to the animal alone; and the title and descriptive terms used in the following specification are to be construed accordingly. However, in the following specification I will generally refer to the figure of the animal represented in these drawings as a horse, but will do so wholly in the interest of brevity and without intending thereby any unnecessary limitation to the scope of my claims.

Referring to the drawings,—

Figure 1 is an elevation of a toy embodying my invention.

Figure 2 is a plan view of the toy.

Figure 3 is a view similar to Figure 1 showing a modification in the means for connecting the figure of the horse and rider to one another.

Figure 8:
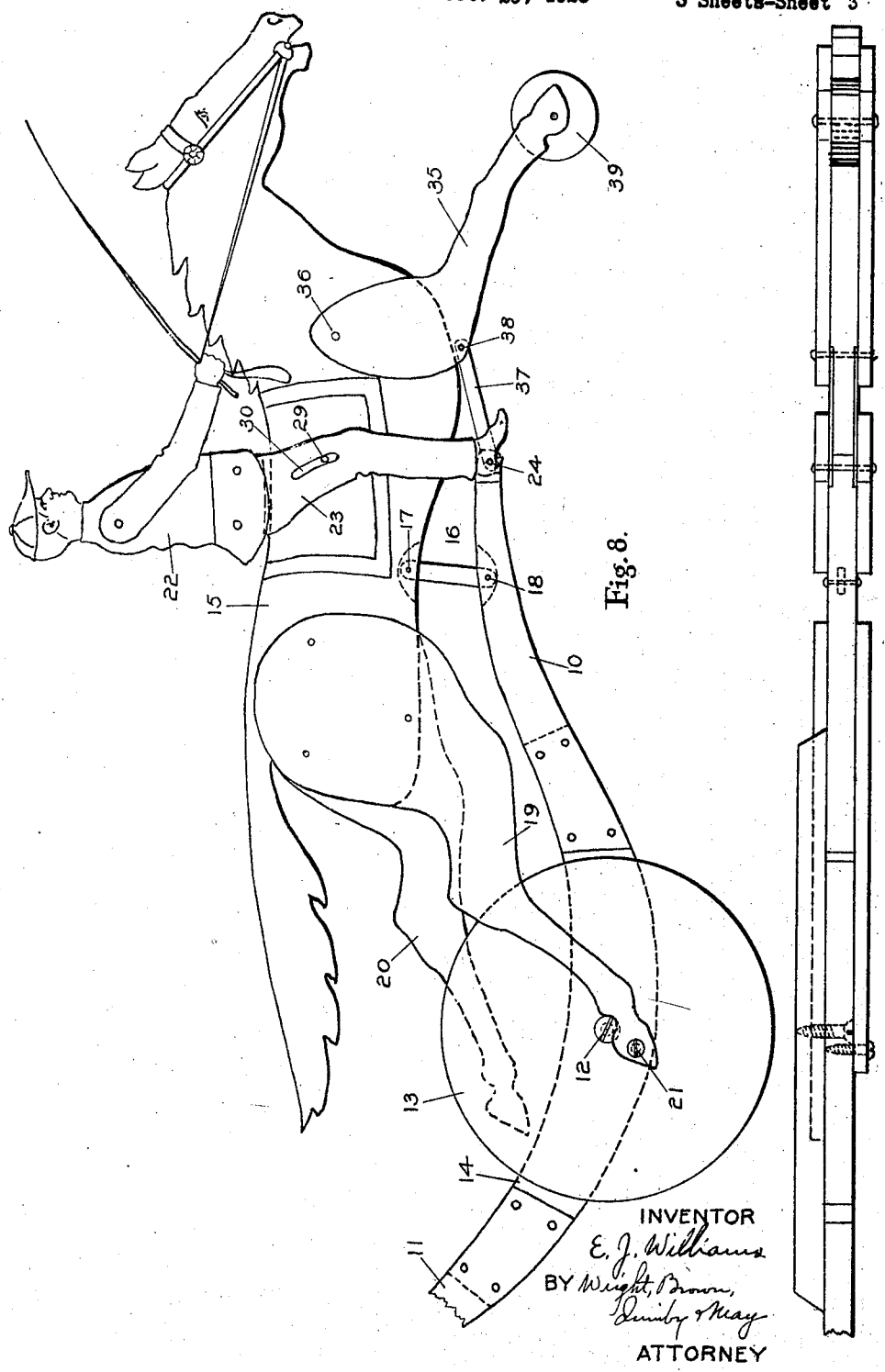

Figure 4 comprises two detail views of the link between the frame of the toy and the body of the horse shown in Figures 1 and 3.

Figure 5 is a fragmentary view similar to Figure 1 and showing a different form of connection between the frame of the toy and the horse and the rider, respectively.

Figure 6 is a fragmentary end view of the toy shown in Figure 5.

Figure 7 represents two detail views of the double link or bell crank which forms the modified connection illustrated in Figures 5 and 6.

Figure 8 is a side elevation of a similar toy having in addition means for giving a swinging movement to the fore legs of the horse.

Like reference characters designate the same parts wherever they occur in all the figures.

The toy comprises a body portion or frame 10 from which a handle 11 extends, and to which is connected by means of a pivot 12 a wheel 13 on which the toy may be trundled over the ground. The handle is not fully shown, but it may be understood as extending upward and rearward to such height that when the wheel rests on the ground it may be conveniently grasped and held by a child of an age to which such toys appeal, with the frame in approximately the position shown in these drawings. In order to bring the handle and frame 10 in the same plane with the wheel, and also to make the structure as simple and light as possible, I have preferred to make the parts 10 and 11 of separate pieces and connect them by means of an intermediate plate or bar 14, in which the pivot 12 is mounted. This pivot, by the way, may conveniently be a simple wood screw, and all of the main parts of the toy may be and preferably are of wood, cut from thin board stock. However, many other ways of making the ground or frame part of the toy may be followed, as will later appear.

A figure 15 representing the body of a horse or any other chosen running animal is connected to the part 10 of the body structure by a link 16, the latter extending at its ends into saw kerfs in the connected parts and being held by pivots 17 and 18. Preferably the hind legs 19 and 20 of the horse are spread so as to straddle the wheel and in order that there may be sufficient space between them for this purpose the legs are preferably made separate from the body of the horse and are attached to opposite sides of the rear end of said body. One of the hind legs (that designated 19 in these drawings) is connected to the wheel by an eccentric crank pin 21, which is preferably a wood screw passing through a hole in the horse's hoof and set into the wheel.

The rider comprises a body 22 to which are secured legs 23 straddling the body of the horse and connected to the forward extension of the frame by a pivot 24. It also includes arms 25 connected to the body by a pivot 26 and to the neck of the horse by a pivot 27. Conveniently the rider's body is slightly thicker than the body of the horse and the rider's legs are placed against opposite sides of its body and fastened thereto, being thus spread apart so as to straddle the body of the horse without binding. The rider's arms also embrace the bodies of both the rider and the horse. Mechanically they are links connecting the upper part of the rider to the forward part of the animal.

It will now be seen that the rider, the horse, and the frame are all connected to one another flexibly, while the horse is connected at one of its extremities to the wheel by a crank. Therefore, when the toy is rolled on the ground the crank moves the hind foot of the horse in a circular path. This causes an up and down oscillation of the whole body of the horse about the pivot 17 of the link 16 and a forward and rear translative motion of the whole horse about the pivot 18. A more realistic appearance of running is thus given to the horse than is given by the conventional up and down oscillation about a fixed pivot. The movement of the horse being conveyed to the rider at the same time, through the arm 25, causes the rider to sway forward and back about the pivot 24 and causes the arms to swing up and down about the pivot 26. The vertical oscillation of the horse also gives the appearance of the rider rising and descending with each leap of the horse.

The entire combination of movements gives a most realistic simulation of the movements of an equestrian riding his horse at a canter.

For the rest, the parts of the toy may be painted or otherwise decorated as suits the designer's fancy to represent a horse of any color and appearance and a rider of any description. And also instead of the figure of a horse I may provide, as previously stated, the figure of any other animal as the mount and the figure of any other sort of a rider.

Figure 3 represents a modification in which the connection between the horse and the rider is made by a pin 29 set into the body of the horse and projecting at its ends into slots 30 in the legs (or a slot in one of the legs) of the rider. Or, by reversal the pin may be mounted in the rider and project into a slot in the horse. In either case the slot is made long enough and extended in the proper directions to permit rise and descent of the horse relative to the rider, and also to cause back and forth swaying movements of the rider with the horse. In this case the pivot connection 27 between the rider's arms and the neck of the horse is dispensed with, and both of the rider's arms may be placed in any position desired. So also may one of the rider's arms in the construction first described, for one arm only is necessary and sufficient in that construction to connect the upper part of the rider to the horse. In the second construction the pin and slot connection gives essentially similar movements of the horse and rider with respect to one another, although the movements may not be exactly the same, and dispenses with the need of placing at least one of the arms in a prescribed position.

In Figure 5 the horse and rider are both connected to the frame by a single mechanical element, namely, a bell crank lever 31 pivoted at 32 to the frame and having one of its arms pivoted at 33 to the horse and its other arm pivoted at 34 to the foot of the rider. A connection between the rider and the horse may be made by either of the means previously described, that is, by using one of the arms as a link or by the pin and slot connection. The oscillations given to the bell crank lever by the movements of the horse cause the rider actually to move up and down, thus bringing about a wider separation between the body of the rider and the saddle with each leap of the horse than occurs with either of the constructions previously described.

Figure 6 showing a front view of the construction represented in Figure 5, also shows in what manner the legs and body of the rider are assembled so that these legs will straddle the body of the horse. The construction just referred to is common to all forms of the invention illustrated in these drawings.

Figure 8 represents the form of the toy which is illustrated in Figure 3, with the addition thereto of means for swinging the fore legs of the animal. The fore legs 35 are arranged, like the hind legs, at opposite sides of the body of the horse but are connected by a pivot 36 so that they may swing. They are also connected by a link 37 with the frame of the toy, such link being conveniently connected to the frame by the same pivot 24 which connects the legs of the rider to the frame and being connected to the fore legs by a pivot 38. It will be apparent that as the body of the horse swings forward and back the fore legs rock about the pivot 38, while the swinging of the link 37 around the pivot 34 permits the vertical oscillation of the horse to take place without impedance. I have also shown in Figure 8 a small roll or wheel 39 at the extremity of the fore legs to prevent these legs from being caught by an obstruction on the floor or ground in case the toy should be tilted forward in its course.

The feature involved in the swinging fore legs, and also that in the guard roll 39, may be applied to either of the forms of the invention disclosed in Figure 1 or Figure 5, as well as to the specific design with which it is here shown combined. In other words, the provision of a swinging fore leg does not exclude the possibility of using in the same construction either the means of connecting the horse and rider consisting of the latter's arm or the means for connecting both the horse and rider to the frame by a single bell crank.

The principles of this invention as hereinbefore described may be combined with many specifically different constructions of frame or supporting base. For instance, instead of providing a single wheel for the frame I may construct a wider frame having two wheels side by side, thereby giving more stable support, and in that case the wheels may be connected by an axle and the crank for oscillating the horse may be made as an offset in such axle.

What I claim and desire to secure by Letters Patent is:

1. A toy comprising a frame, the figure of an animal connected by its body portion to the frame in a manner permitting back and forth movement, the said animal figure having fore and hind legs, of which one is rigid with the body and the other is connected pivotally thereto, a wheel mounted rotatably on the frame and having a crank which is connected to the rigid leg, and a flexible connection between the frame and the pivoted leg arranged to cause swinging movement of said leg as a result of back and forth movement of said body.

2. A toy comprising a frame, a wheel rotatably connected with said frame and adapted to roll on the ground, a figure of an animal, a substantially upright link pivoted to said frame and to the body portion of said figure, whereby the figure is enabled to rock up and down and also to move back and forth relatively to the frame, and a crank connected to the wheel and to a rigidly joined part of said figure at a distance from said link.

3. A toy comprising a frame, a wheel rotatably connected with said frame and adapted to roll on the ground, a figure of an animal, a substantially upright link pivoted to said frame and to the body portion of said figure, whereby the figure is enable to rock up and down and also to move back and forth relatively to the frame, and a crank connected to the wheel and to a rigidly joined part of said figure at a distance from said link, said animal figure having a pivoted leg and a link connected to the frame and to said leg and extending in a direction substantially at right angles to the direction of the first-named link.

4. A toy comprising a frame, the figure of an animal connected by its body portion to the frame in a manner permitting both rocking movement of the body about a horizontal axis, and reciprocative movement of the body in substantially horizontal directions relatively to the frame, the said animal figure having a pivotally connected leg, means connecting said leg to said frame in a manner to cause oscillation of the leg when the body is moved relatively to the frame, a wheel rotatably connected to the frame, and a crank connected to a rigid part of said figure whereby to cause the aforesaid movements of the figure when the wheel is rotated.

5. A toy comprising a frame, the figure of an animal and the figure of a rider for the animal, a wheel rotatably mounted on the frame, a crank connected to and rotatable with said wheel and engaged with a part of said animal figure, a connection between the frame and the body portion of the animal constructed and arranged to cause such portion to move back and forth relatively to the frame in substantially parallel directions when the crank is rotated, a connection between the frame and the lower part of the rider constructed to permit rocking movement of the rider and to prevent horizontal movement of that part of the rider which is so connected to the frame, and a connection between the figures of the rider and the animal arranged to impart back and forth movement from the animal to the rider and to permit relative up and down movement between them.

6. A toy comprising a frame, a wheel rotatably mounted on the frame, a crank connected with the wheel, a substantially upright link pivoted to the frame and to the body portion of the animal, the animal having a rigid extremity which is connected to said crank and moved in a circular orbit thereby, a figure of a rider seated on the animal, pivoted at its lower extremity to the frame, and a connection between the rider and the animal constructed to impart back and forth movement to the former from the latter while permitting relative up and down movements between them.

7. An equestrain toy comprising the figure of a running animal having a body, an extended rigid hind leg and an extended pivoted fore leg, a frame, a substantially upright link pivoted to said frame and to the body of the animal, a substantially horizontal link pivotally connected to the frame and to said fore leg, a wheel rotatably mounted on the frame and adapted to roll on the ground, a crank connected to said wheel and to the extended hind leg, and the figure of a rider seated on said animal, a connection between the lower part of the latter figure and the frame arranged to prevent back and forth movement of the part connected thereby, and a connection between the animal and the upper part of the rider constructed to impart back and forth movement from the former to the latter while permitting relative up and down movement between them.

In testimony whereof I have affixed my signature.

ELHANAN J. WILLIAMS.